United States Patent
Hoshino

(10) Patent No.: US 10,689,766 B2
(45) Date of Patent: Jun. 23, 2020

(54) LITHIUM SELECTIVE PERMEABLE MEMBRANE, LITHIUM RECOVERY DEVICE, LITHIUM RECOVERY METHOD, AND HYDROGEN PRODUCTION METHOD

(71) Applicant: National Institutes for Quantum and Radiological Science and Technology, Chiba (JP)

(72) Inventor: Tsuyoshi Hoshino, Aomori (JP)

(73) Assignee: NATIONAL INSTITUTES FOR QUANTUM AND RADIOLOGICAL SCIENCE AND TECHNOLOGY, Chiba (JP)

(*) Notice: Subject to any disclaimer, the term of this patent is extended or adjusted under 35 U.S.C. 154(b) by 41 days.

(21) Appl. No.: 16/073,546

(22) PCT Filed: Jan. 26, 2017

(86) PCT No.: PCT/JP2017/002612
§ 371 (c)(1),
(2) Date: Jul. 27, 2018

(87) PCT Pub. No.: WO2017/131051
PCT Pub. Date: Aug. 3, 2017

(65) Prior Publication Data
US 2019/0032230 A1 Jan. 31, 2019

(30) Foreign Application Priority Data
Jan. 29, 2016 (JP) .................................. 2016-015423

(51) Int. Cl.
*C25B 7/00* (2006.01)
*B01D 61/46* (2006.01)
(Continued)

(52) U.S. Cl.
CPC ................. *C25B 7/00* (2013.01); *B01D 61/44* (2013.01); *B01D 61/46* (2013.01); *B01D 69/12* (2013.01);
(Continued)

(58) Field of Classification Search
CPC .......... C25B 7/00; B01D 61/44; B01D 61/46; B01D 69/12; B01D 71/022; B01D 71/024; C02F 1/4693
See application file for complete search history.

(56) References Cited

U.S. PATENT DOCUMENTS

| | | |
|---|---|---|
| 5,951,843 A | 9/1999 | Itoh et al. |
| 2004/0074774 A1 | 4/2004 | Chang et al. |
| 2016/0201163 A1 | 7/2016 | Hoshino |

FOREIGN PATENT DOCUMENTS

| | | |
|---|---|---|
| JP | 10-102272 A | 4/1998 |
| JP | 2004-142986 A | 5/2004 |

(Continued)

OTHER PUBLICATIONS

International Search Report for Application No. PCT/JP2017/002612 dated Mar. 7, 2017, 4 pages.
(Continued)

*Primary Examiner* — Nicholas A Smith
(74) *Attorney, Agent, or Firm* — Alston & Bird LLP

(57) ABSTRACT

The disclosure relates to recovering Li ions in a raw liquid into a recovery liquid at a high recovery speed. A lithium selective permeable membrane is constituted of a selective permeable membrane main body constituted of a lithium ion superconductor (ion conductor) having a particularly high ion conductivity and a Li adsorption layer formed as a thin layer on a raw liquid side (a first electrode) thereof. As a material constituting the selective permeable membrane main body, specifically, lanthanum lithium titanium oxide (Continued)

can be used. The Li adsorption layer is formed as a thin layer on a surface of the selective permeable membrane main body by carrying out a chemical treatment on the selective permeable membrane main body.

15 Claims, 7 Drawing Sheets

(51) Int. Cl.
    *C01D 15/08* (2006.01)
    *C22B 26/12* (2006.01)
    *B01D 61/44* (2006.01)
    *B01D 69/12* (2006.01)
    *B01D 71/02* (2006.01)
    *C02F 1/469* (2006.01)
    *C25B 1/10* (2006.01)
    *C25B 9/10* (2006.01)
    *H01M 8/22* (2006.01)
    *B01D 67/00* (2006.01)
    *B01D 69/02* (2006.01)
    *C02F 103/08* (2006.01)
    *C02F 101/10* (2006.01)

(52) U.S. Cl.
CPC ......... *B01D 71/022* (2013.01); *B01D 71/024* (2013.01); *C01D 15/08* (2013.01); *C02F 1/4693* (2013.01); *C22B 26/12* (2013.01); *C25B 1/10* (2013.01); *C25B 9/10* (2013.01); *B01D 67/0093* (2013.01); *B01D 69/02* (2013.01); *C02F 2101/10* (2013.01); *C02F 2103/08* (2013.01); *H01M 8/227* (2013.01); *Y02E 60/366* (2013.01); *Y02E 70/10* (2013.01); *Y02P 10/234* (2015.11)

(56) References Cited

FOREIGN PATENT DOCUMENTS

| JP | 2009-161794 A | 7/2009 |
| JP | 2010-029797 A | 2/2010 |
| JP | 2012-504190 A | 2/2012 |
| JP | 2013-001951 A | 1/2013 |
| JP | 2015-034315 A | 2/2015 |
| KR | 2014-0118244 A | 10/2014 |
| KR | 20150106329 A * | 9/2015 |
| WO | WO 2015/020121 A1 | 2/2015 |

OTHER PUBLICATIONS

"Innovative lithium recovery technique from seawater by using world-first dialysis with a lithium ionic supeconductor" by Tsuyoshi Hoshino, Elsevier, Desalination 359 (2015) pp. 59-63, journal homepage: www.elsevier.com/locate/desal03
"Recovery of Lithium from Seawater Using Manganese Oxide Absorbent (H1.6Mn1.6O4) derived from Li1.6Mn1.6O4" by Ramesh Chitrakar et al., Ind. Eng. Chem. Res. 2001, 40, pp. 2054-2058.
"Recovery and recycling of lithium: A review" by Swain, B., Separation and Purification Technology vol. 172, Jan. 1, 2017, pp. 388-403.
Korean Notice of Allowance for KR Appln No.10-2018-7021421 dated Nov. 26, 2019, w/English translation (4 pages).

* cited by examiner

LITHIUM SELECTIVE PERMEABLE MEMBRANE, LITHIUM RECOVERY DEVICE, LITHIUM RECOVERY METHOD, AND HYDROGEN PRODUCTION METHOD

TECHNICAL FIELD

The present invention relates to a lithium selective permeable membrane that selectively transmits lithium ions, and a lithium recovery device, a lithium recovery method, and a hydrogen production method which recovers lithium in a liquid using the same.

BACKGROUND ART

Recently, the importance of lithium (Li) in the industry has been intensifying due to its use in the production of materials of lithium ion batteries or fuels of nuclear fusion reactors. For example, large lithium-ion batteries are used as power supplies of electric vehicles or power storage for smart grids and smart houses. For such uses, techniques for producing Li which serves as a raw material of large lithium-ion batteries at a low cost are required. Meanwhile, in nuclear fusion reactors, tritium which serves as a fuel for nuclear fusion is produced using Li, and thus a large amount of Li is also required in this use.

Li can be extracted from minerals, but is also known to be included in the seawater, and the total amount of Li included in the entire seawater across the globe is massive. Therefore, in a case in which Li can be extracted from the seawater, it is possible to obtain a large amount of Li at a low cost.

Therefore, techniques for recovering Li from an aqueous solution including Li have been proposed. Patent Documents 1 and 2 describes techniques for selectively recovering Li by selectively adsorbing Li (ions) to an adsorbant in the seawater and then desorbing Li from the adsorbent. As the adsorbent, manganese oxide is used in the technique described in Patent Document 1, and a vinyl monomer material is used in the technique described in Patent Document 2.

In addition, Patent Document 3 describes a Li (ion) recovery device in which a lithium ion superconductor having a particularly high ion conductivity of lithium ions (for example, $Li_{1+x+y}Al_x(Ti, Ge)_{2-x}Si_yP_{3-y}O_{12}$) is used as a selective permeable membrane that selectively transmits Li ions, a raw liquid (a target liquid from which Li is recovered) and a recovery liquid (a liquid that stores recovered Li) are separated from each other using a structure in which electrodes are provided on both surfaces of the selective permeable membrane, and Li (ions) in the raw liquid is moved in the recovery liquid. In this structure, Li ions can be particularly efficiently recovered at a high selectivity by applying a voltage between both electrodes. Actually, a large amount of Li can be obtained by installing an using Li recovery devices as described above at a specific place (for example, salt lakes in South America) in a large scale.

CITATION LIST

Patent Literature

[Patent Document 1] Published Japanese Translation No. 2012-504190 of the PCT International Publication
[Patent Document 2] Japanese Unexamined Patent Application, First Publication No. 2009-16174
[Patent Document 3] WO2015/020121

SUMMARY OF INVENTION

Technical Problem

In a case in which U is obtained using the above-described Li recovery device, the necessary cost (Li production cost) is preferably low. Particularly, in a case in which the above-described Li recovery devices are installed and used in a large scale, the cost necessary for the installation or operation of the devices increases, and, in order to sufficiently decrease the production cost by offsetting the increase in the above-described cost, the speed of recovering Li from a raw liquid to a recovery liquid (recovery speed) needs to be sufficiently fast.

From this viewpoint, the recovery speed in the technique described in Patent Document 3 is faster than those in the techniques described in Patent Documents 1 and 2, but is still not fast enough to meet the required Li production cost, and there has been a demand for an additional improvement of the recovery speed.

Therefore, there has been a desire for recovering Li ions in a raw liquid into a recovery liquid at a high recovery speed.

The present invention has been made in consideration of the above-described problem, and an object of the present invention is to provide an invention that solves the above described problems.

Solution to Problem

The present invention has a constitution described below in order to solve the above-described problems.

A lithium selective permeable membrane of the present invention is a lithium selective permeable membrane that is configured to selectively transmit lithium (Li) ions from a first main surface side toward a second main surface side, the lithium selective permeable membrane including a selective permeable membrane main body constituted of a ion conductor of lithium as a main body and a lithium adsorption layer that is formed on a surface of the selective permeable membrane main body on the first main surface side and selectively adsorbs the lithium ions.

In the lithium selective permeable membrane of the present invention, the lithium conductor is $(Li_x, La_y)TiO_z$, (here, $x=3a-2b$, $y=2/3-a$, $z=3-b$, $0<a\leq 1/6$; $0\leq b\leq 0.06$, $x>0$).

In the lithium selective permeable membrane of the present invention, the selective permeable membrane main body is a sintered body including the ion conductor as a main body.

In the lithium selective permeable membrane of the present invention, the selective permeable membrane main body is constituted of particles, which are bonded together through a cation permeable membrane; constituted of the ion conductor.

In the lithium selective permeable membrane of the present invention, the cation permeable membrane is constituted of NAFION (registered trademark), SELEMION (registered trademark), or an ion liquid having a polymerized TFSI anion $((CF_3SO_2)_2N^-)$.

In the lithium selective permeable membrane of the present invention, the lithium adsorption layer is formed by an acid treatment on the surface of the selective permeable membrane main body on the first main surface side.

In the lithium selective permeable membrane of the present invention, the lithium adsorption layer includes lithium adsorption substance particles that are each constituted of a substance different from the selective permeable membrane main body and that each have a particle shape.

In the lithium selective permeable membrane of the present invention, the lithium adsorption substance particles are formed by carrying out an acid treatment on lithium manganate ($Li_{1.5}Mn_2O_4$).

A lithium recovery device of the present invention is a lithium recovery device that recovers lithium into a recovery liquid which is an aqueous solution by moving lithium ions from a raw liquid which is an aqueous solution and includes the lithium to the recovery liquid, the lithium recovery device including the selective permeable membrane installed so as to separate the raw liquid and the recovery liquid with the raw liquid placed on the first main surface side and the recovery liquid placed on the second main surface side, a mesh-like first electrode fixed to the first main surface side of the lithium selective permeable membrane, and a mesh-like second electrode fixed to the second main surface side of the lithium selective permeable membrane.

A lithium recovery method of the present invention includes a pH conversion step of generating a treatment liquid that is an alkaline aqueous solution containing lithium from a raw material liquid that is non-alkaline aqueous solution containing lithium and a recovery step of recovering lithium into the recovery liquid using the treatment liquid obtained after the pH conversion step as the raw liquid and the lithium recovery device.

In the lithium recovery method of the present invention, in the pH conversion step, an electrodialysis treatment is earned out with the raw material liquid disposed on a positive potential side and an aqueous solution disposed on a negative potential side using a cation exchange membrane as boundary, and then the aqueous solution on the negative potential side is used as the treatment liquid.

The lithium recovery method of the present invention further includes a recovery step of recovering lithium into the recovery liquid from the raw liquid using the lithium recovery device.

In the lithium recovery method of the present invention, the first electrode is used as a positive side, the second electrode is used as a negative side, and a voltage is applied between the first electrode and the second electrode.

The lithium recovery method of the present invention further includes a lithium carbonate generation step of generating lithium carbonate by transmitting carbon dioxide through the recovery liquid obtained after the recovers step using pure water as the recovery liquid before initiation of the recovery step.

In a hydrogen production method of the present invention, in the lithium recovery device, pure water is used as the recovery liquid, the first electrode is used as a positive side, the second electrode is used as a negative side, and a voltage is applied between the electrode and the second electrode, thereby generating hydrogen from the recovery liquid.

Advantageous Effects of Invention

The present invention is constituted as described above, and thus it is possible to recover Li ions in a raw liquid into a recover liquid at a high recovery rate.

DESCRIPTION OF EMBODIMENTS

Hereinafter, a lithium selective permeable membrane according to an embodiment of the present invention, and a Li recovery device and a Li recovery method in which the lithium selective permeable membrane is used will be described. The selective permeable membrane (lithium selective permeable membrane) includes a lithium ion superconductor as used for a selective permeable membrane described in Patent Document 3 as a main body.

In a Li (ion) recovery device described in Patent Document 3, in a case in which the lithium ion superconductor is used as the selective permeable membrane, it is possible to increase the recovery efficiency of the lithium by increasing an ion current of Li ions that flow between electrodes. Here, Li ions that are included in an aqueous solution are present as Li hydrated ions having water molecules coordinated thereto in the vicinity. In order to further increase the ion current, it is effective to realize a status in which the water molecules are easily removed from a surface of the selective permeable membrane (an interface between the selective permeable membrane and a raw liquid).

Therefore, on the surface of the selective permeable membrane which becomes the embodiment of the present invention, a Li adsorption layer that adsorbs Li ions (excluding hydrates) in the raw liquid is formed. As the Li adsorption layer, there are two types of Li adsorption layers, that is, (1) a Li adsorption layer formed by reforming a surface of a material constituting the selective permeable membrane and (2) a Li adsorption layer which is made of a material different from the selective permeable membrane and formed a thin membrane state on the surface of the selective permeable membrane.

Figure 1:
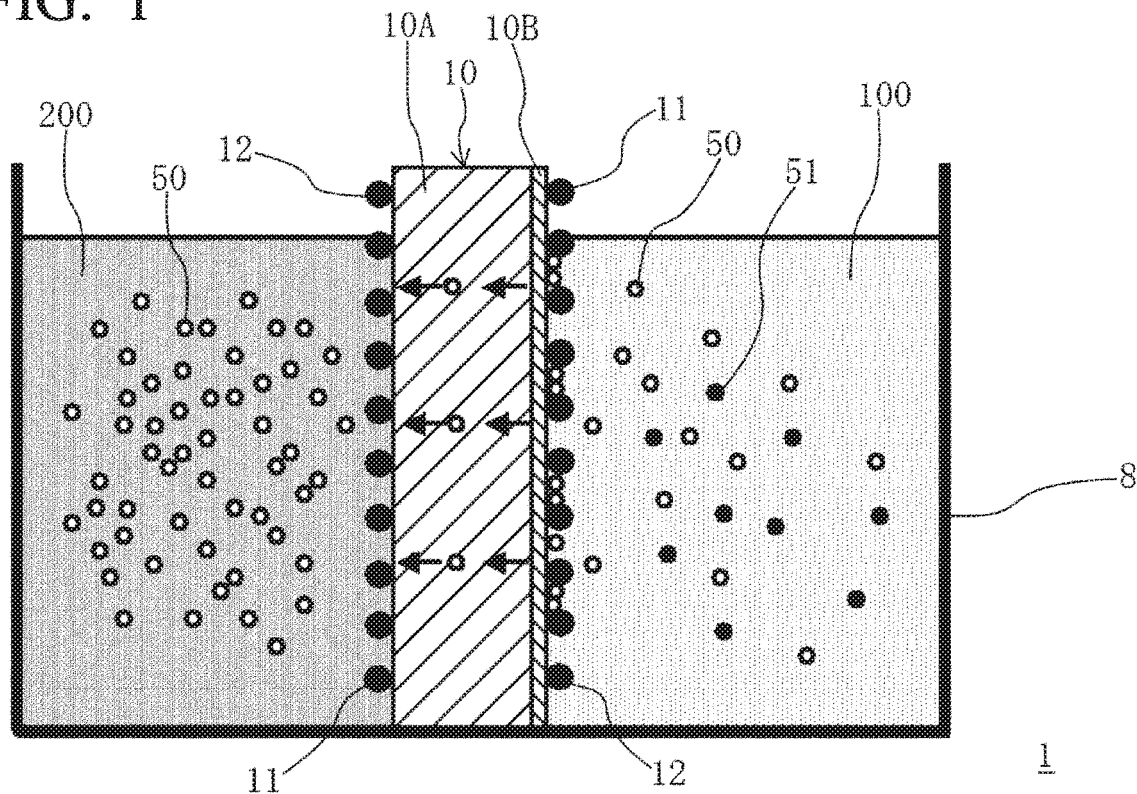
FIG. 1 is a view showing a constitution of a lithium (ion) recovery device according to an embodiment of the present invention.

FIG. 1 is a constitution view showing a principle of a Li (ion) recovery device 1. Constitutions other than a selective permeable membrane 10 in this constitution are the same as those described in Patent Document 3. In the metal ion recovery device 1, the selective permeable membrane (lithium selective permeable membrane) 10 that selectively transmits Li is used, and mesh-like first electrode 11 and second electrode 12 are respectively formed on both main surfaces of the flat plate-like selective permeable membrane 10. This structure is provided in a treatment tank 8, and a raw liquid 100 that is an aqueous solution including Li ions ($Li^+$) 50 and a recovery liquid 200 that is an aqueous solution which serves as a place of Li recovery are separated from each other by the selective permeable membrane 10 in the treatment tank 8. The raw liquid 100 includes monovalent cations other than the Li ions 50 (here, Na ions ($Na^+$) 51 are used) together with she Li ions 50.

Meanwhile, the structures and materials of the first electrode 11 and the second electrode 12 are the same as those described in Patent Document 3. In addition, in the structure of FIG. 1, a collector constituted of a carbon felt sheet or the like may be interposed between the mesh-like first electrode 11 or second electrode 12 and the selective permeable membrane 10 as described in Patent Document 3. The fact that the area of the selective permeable membrane 10 can be increased using a joining layer is also the same.

At this time, no voltage is applied to the first electrode 11 and the second electrode 12 from the outside, and conversely, the Li recovery device 1 can be used as a battery that extracts power from the electrodes (battery mode). In this case, it is possible to move the Li ions 50 to the recovery liquid 200 from the raw liquid 100 (the Li ions 50 are made to flow as an ion current), and simultaneously, a voltage which makes the first electrode 11 serve as a negative side and the second electrode 12 serve as a positive side is generated. On the other hand, when a voltage is applied to the first electrode 11 and the second electrode 12 from the outside, it is possible to increase the ion current of the Li ions 50 more than the above-described case (electrodialysis mode). In this case, it is possible to increase the recovery efficiency of, particularly, Li (the Li ions 50) into the recovery liquid 200 although power is required.

The selective permeable membrane 10 is constituted of a selective permeable membrane main body 10A constituted of a lithium ion superconductor (ion conductor)) having a particularly high ion conductivity and a Li adsorption layer 10B formed as a thin layer on a raw liquid 100 side (the first electrode 11 side) thereof. As a material constituting the selective permeable membrane main body 10A, specifically, lanthanum lithium titanium oxide; ($Li_x$, $La_y$)$TiO_2$ (here x=3a−2b, y=⅔−a, z=3−b, 0<a≤⅙, 0≤b≤0.06, x>0) (hereinafter LLTO) can be used, and more specifically, $Li_{0.29}La_{0.57}TiO_3$ (a≈0.1, b≈0) can be used. This material can be obtained, for example, as a sintered body obtained by mixing particles constituted of the material with a sintering aid or the like and sintering the mixture at a high temperature (1,000° C. or higher). In this case, a surface of the selective permeable membrane 10 can also be constituted as a porous substance in which fine particles constituted of LLTO are bonded together (sintered), and thus it is possible to increase the effective area of the surface of the selective permeable membrane main body 10A.

In the lithium ion superconductor, Li is included as one of constituent elements, and Li ions outside the crystals move between Li sites in the crystals, which develops the ion conductivity. The Li ions 50 flow in the selective permeable membrane main body 10, but the Na ions 51 are incapable of flowing in the selective permeable membrane 10. At this time, ions that are conducted in the crystals are the Li ions ($Li^+$) 50, and hydrate ions of Li which are present in the raw liquid 100 together with the Li ions 50 do not enter the Li sites and are thus not conducted in the crystals. Regarding the above-described fact, the lithium ion superconductor is the same as that of the selective permeable membrane described in Patent Document 3.

Here, when, particularly, only a number of the Li ions 50 are adsorbed to the surface of the selective permeable membrane main body 10A using the Li adsorption layer 10B, the water molecules of the Li hydrated ions are removed during the adsorption, and the Li hydrated ions turn into Li ions, and thus it is possible to increase the conduction efficiency (the ion current that flows in the selective permeable membrane main body 10A) of the Li ions 50 from the raw liquid 100 side (the first main surface side) to the recovery liquid 200 side (the second main surface side) in the selective permeable membrane main body 10A.

Figure 2:
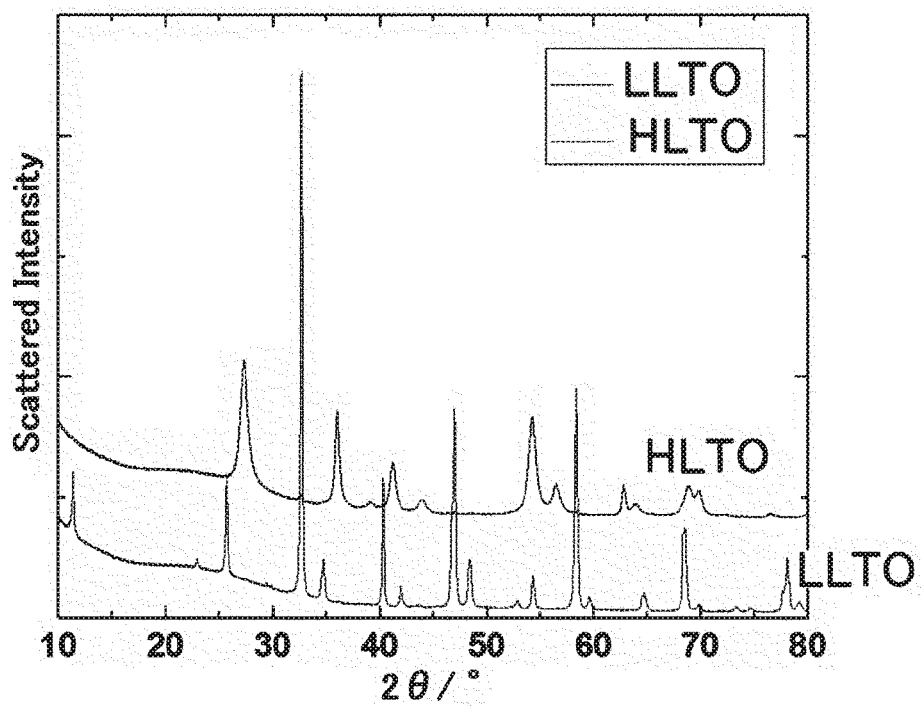
FIG. 2 shows X-ray diffraction results of LLTO and a layer formed by an acid treatment on a surface of LLTO (HLTO).

The Li adsorption layer 10B is formed as a thin layer on the surface of the selective permeable membrane main body 10A by carrying out a chemical treatment on the selective permeable membrane main body 10A. Specifically, the Li adsorption layer is formed by carrying out an acid treatment on one main surface of the selective permeable membrane main body 10A (LLTO), for example, exposing the surface to hydrochloric acid or nitric acid for five days. It is assumed that a substance layer (HLTO) having a composition similar to $H_{0.29}La_{0.57}TiO_3$ in which Li, which is an element that is particularly likely to be oxidized among the constituent elements of LLTO, is substituted by hydrogen in an acid due to the above-described treatment is formed. FIG. 2 shows X-ray diffraction results of LLTO and the thin layer (HLTO) formed at this time on the surface. From the results, it is confirmed that LLTO and HLTO has peaks at different locations, and it is possible to confirm that a substance layer different from LLTO is formed on the surface due to the above-described treatment although the details cannot be specified.

H sites in HLTO are originally sites which Li enters, and thus H is likely to substitute the Li ion, but not likely to substitute other ions (the Na ion 51 or the like). Therefore, HLTO functions as the Li adsorption layer 10B. In addition, HLTO is generated from a reaction with an acid and thus formed only on the outermost surface of the selective permeable membrane main body 10A.

Actually, the constitution of FIG. 1, an alkaline aqueous solution into which 0.1M of LiOH, NaOH, and KOH were mixed was used the raw liquid 100. $Li_{0.29}La_{0.57}TiO_3$ was used as the selective permeable membrane main body 10A, and a current between the first electrode 11 and the second electrode 12 which is generated depending on the presence and absence of the Li adsorption layer 10B that is HLTO formed as described above was investigated. Tins current is an ion current by the Li ions 50, and thus the intensity of the current reflects the degree of the recovery efficiency of Li into the recovery liquid 200. The effective area (an area in contact with the raw liquid 100 and the recovery liquid 200) of the selective permeable membrane 10 was set to 16 $cm^2$.

Figure 3:
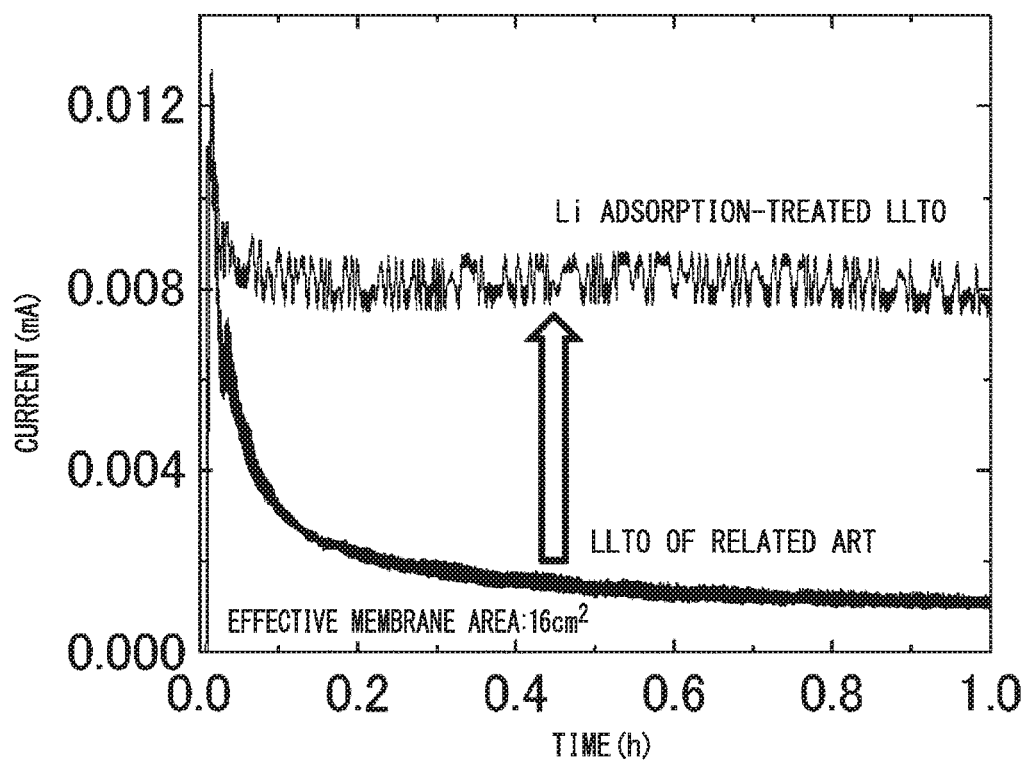
FIG. 3 shows measurement results of changes in currents over time in a case in which the Li recovery device which becomes the embodiment of the present invention is used in a battery mode and a case in which a Li adsorption layer is not used in the same constitution.

FIG. 3 shows changes in currents over time in a ease in which the constitution of FIG. 1 is used in a battery mode, that is, no voltage is applied between the first electrode 11 and the second electrode 12 from the outside depending on the presence and absence of the Li adsorption layer 10B. The results show that, in a case in which the Li adsorption layer 10B is not used, the current immediately decreases from the initial state and reaches the steady-state value. On the other hand, in a case in which the Li adsorption layer 10B is used, a current value higher than the above-described current value is obtained at all times and reaches a value approximately eight times greater the current value in a case in which the Li adsorption layer 10B is not used.

Figure 4:
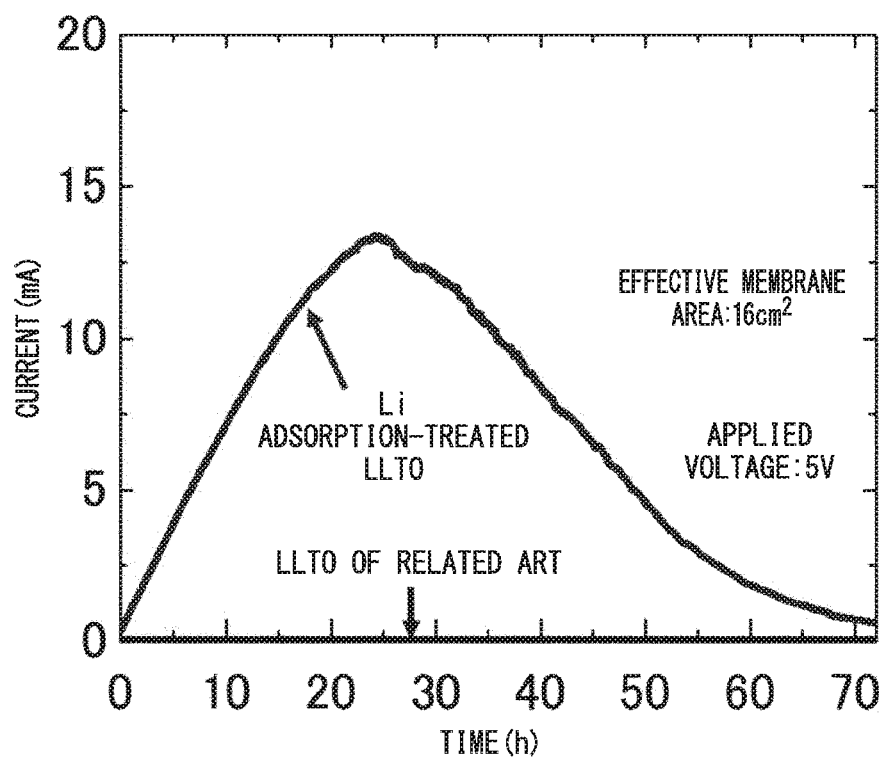
FIG. 4 shows measurement results of changes in currents over time in a case in which the Li recovery device which becomes the embodiment of the present invention is used in an electrodialysis mode and a case in winch a Li adsorption layer is not used in the same constitution.

On the other hand, FIG. 4 respectively shows changes in currents over time in a case in which the same constitution as in the ease of FIG. 3 is used in an electrodialysis mode, that is, a voltage of 5 V is applied between the first electrode 11 and the second electrode 12 from the outside. In this drawing, the current value in a case in which the Li adsorption layer 10B is not used is smaller enough to be ignored (almost equal to the horizontal axis in the drawing) than the current value in a case in which the Li adsorption layer 10B is used. In this case, the current value reaches approximately 12,000 times greater than the current value in a ease in which the Li adsorption layer 10B is not used due to the use of the Li adsorption layer 10B. That is, an extremely high transport efficiency of the Li ions 50 to the recovery liquid 200 is obtained.

Figure 5:
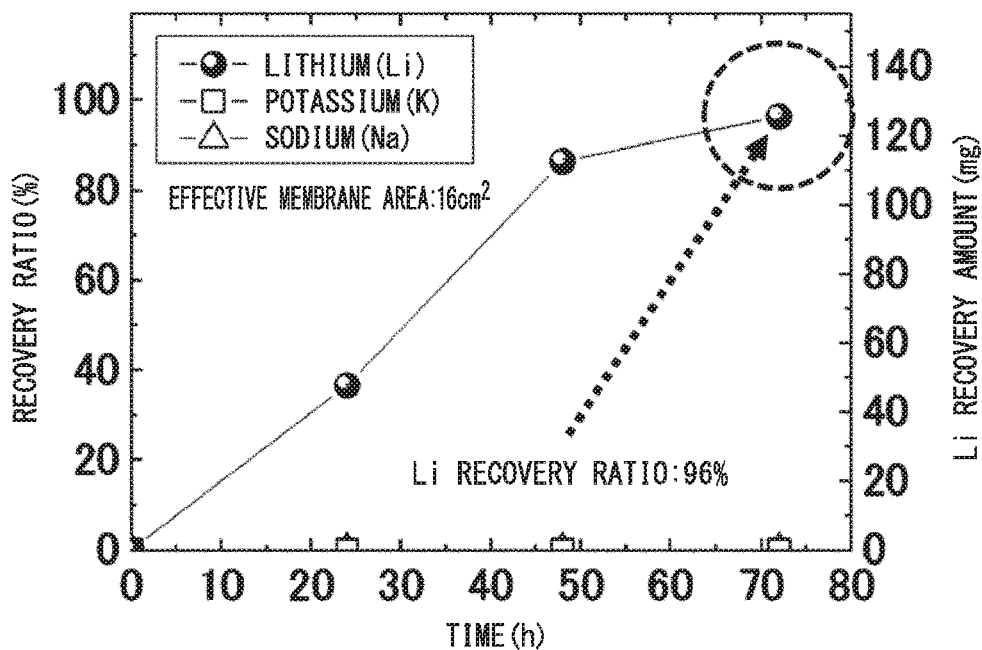
FIG. 5 shows measurement results of changes over time in amounts of Li, K, and Na present in recovery liquid in a case in which the Li recovery device which becomes the embodiment of the present invention is used in the electrodialysis mode.
Figure 6:
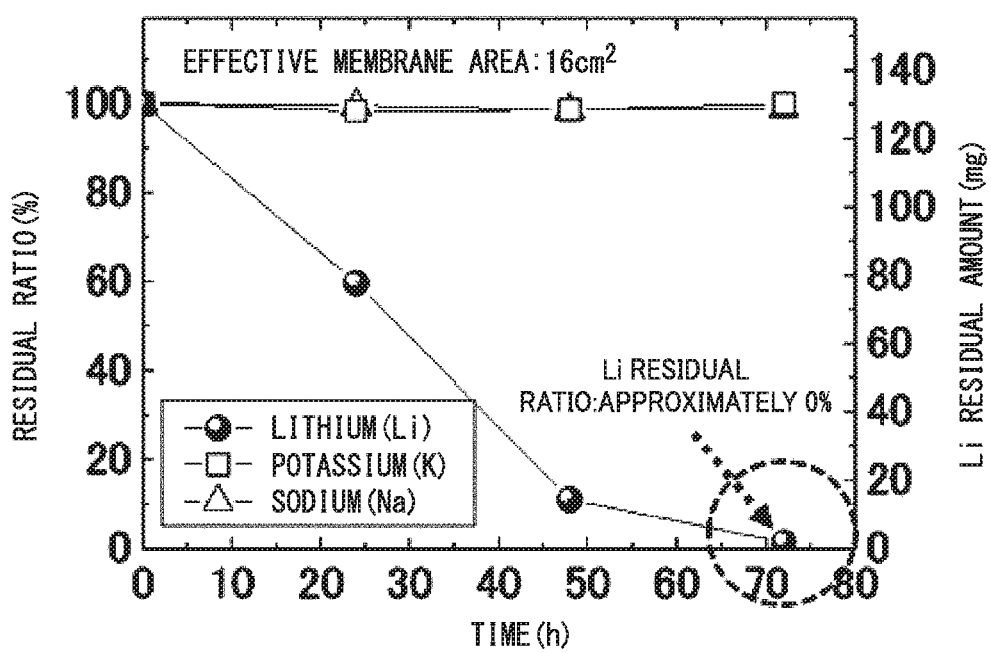
FIG. 6 shows measurement results of changes over time in amounts of Li, K, and Na present in a raw liquid in a case in which the Li recovery device which becomes the embodiment of the present invention is used in the electrodialysis mode.

FIG. 5 shows the measurement results of the amounts (mg) of Li, potassium (K), and sodium (Na) in the recovery liquid 200 in a case in which the same treatment as in FIG. 4 is carried out over time, and FIG. 6, similarly, shows the results of the amounts of these elements in the raw liquid 100 measured in the same manner. Here, the recovery percentage (FIG. 5) refers to the ratio of the amount of each element in the recovery liquid 200 to the amount of each element in the raw liquid 100 in the initial state at each point in time, and the residual percentage (FIG. 6) refers to the ratio of the amount of each element in the raw liquid 100 to the amount of each element in the raw liquid 100 in the initial state. From these results, it is possible to confirm that, particularly, Li is selectively recovered into the recovery liquid 200. In FIG. 4, the current decreases after reaching the maximum value, which is attributed to the amount of the Li ions 50 in the raw liquid 100 which decreases as the recovery proceeds. Therefore, if is possible to recover Li in a Li ion 50 form at a high efficiency using the Li recovery device 1.

In a case in which HLTO is used as the Li adsorption layer 10B, the adsorption efficiency of the Li ions 50 depends on pH, and a particularly great Li (ion) adsorption efficiency was obtained in a case in which the raw liquid 100 that is a subject from which Li is recovered is alkaline. Therefore, the raw liquid 100 is preferably set to be alkaline. Meanwhile, in the nature, the seawater or salt-lake brine water containing a large number of Li ions 50 (raw material liquid) is generally neutral. Therefore, in order to use the raw material liquid as the raw liquid 100, the raw material liquid is preferably set to be alkaline. It is therefore effective to use as an electrodialysis device 2 as shown in FIG. 7.

Here, the seawater or salt-lake brine water is used as a raw material liquid 300 that is an aqueous solution containing a large amount of Li (Li ions 50). As described above, the raw material liquid 300 is neutral (no alkaline). As in the Li recovery device 1, the raw material liquid 300 and a treatment liquid 400 that is a neutral aqueous solution in the initial state (for example, pure water) are separated from each other using a cation exchange membrane 21 in a treatment layer 9. A positive electrode 23 is provided in the raw material liquid 300, and a negative electrode 22 is provided in the treatment liquid 400. Unlike the Li recovery device 1, the positive electrode 23 and the negative electrode 22 are not in contact with the cation exchange membrane 21, the positive electrode 23 side is served as positive, the negative electrode 22 side is served as negative, and a voltage is applied. As the cation exchange membrane 21, for example, SELEMION (registered trademark) CSO or the like which selectively transmits monovalent cations can be used.

Figure 7:
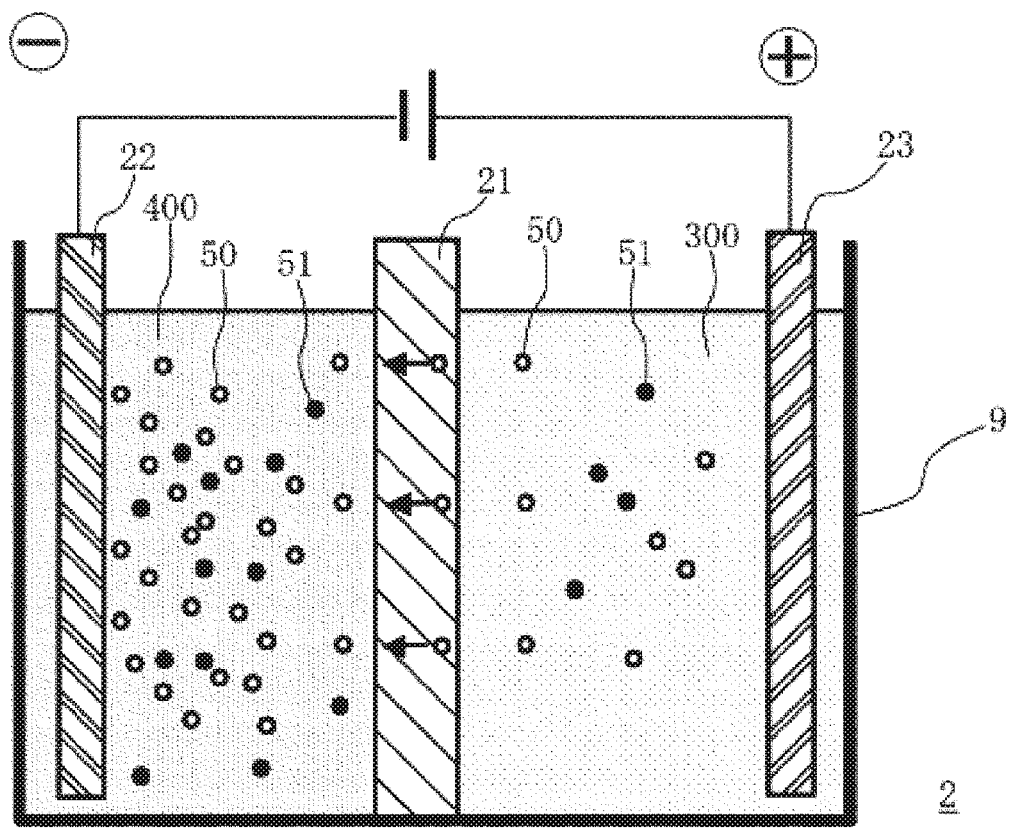
FIG. 7 is a viewing showing a constitution of an electrodialysis device that is used in a Li (ion) recovery method which becomes an embodiment of the present invention.

A constitution of FIG. 7 is the same as that of an ordinarily-known electrodialysis device. In an electrodialysis device 2, monovalent cations such as the Li ions 50 or the Na ions 51 permeate through the cation exchange membrane 21 and move toward the negative electrode 22 (the treatment liquid 400) side, the other polyhydric cations are incapable of easily permeating through the cation exchange membrane 21, and negative ions are incapable of permeating through the cation exchange membrane 21, Therefore, the Li ions 50 ($Li^+$) which are recovery subject move into the treatment liquid 400 from the raw material liquid 300. In addition, in the negative electrode 22, $OH^-$ ions are generated due to the electrolysis of water. Therefore, it is possible to move the Li ions 50 in the raw material liquid 300 into the treatment liquid 400 using the electrodialysis device 2 and, simultaneously, make the treatment liquid 400 alkaline. However, in the electrodialysis treatment, the Na ions 51 and the like which are the other monovalent cations (non-Li monovalent cations) also move into the treatment liquid 400 together with the Li ions 50 at the same time. Therefore, when the treatment liquid 400 after an electrodialysis treatment is used as the raw liquid 100 in FIG. 1, it is possible to selectively recover the Li ions 50 into the recovery liquid 200.

That is, in a case in which an aqueous solution that is not alkaline (the seawater or salt-lake brine water) is used as a raw material, an alkaline aqueous solution including the Li ions 50 (the treatment liquid 400) is generated using the electrodialysis device 2 of FIG. 7, and the alkaline aqueous solution is used as the raw liquid 100 in the Li recovery device 1, whereby it is possible to obtain Li (the Li ions 50) in the recovery liquid 200 at a high efficiency.

Next, a method for extracting Li from the recovery liquid 200 including the Li ions 50 at a high concentration will be described. As described in Patent Document 3, when the uses of Li (a Li ion battery and the like) are taken into account, Li is preferably extracted as lithium carbonate ($Li_2CO_3$) powder. Therefore, Patent Document 3 describes that hydrochloric acid (HCl) is added to the recovery liquid 200, recovery is carried out, and then a sodium carbonate ($Na_2CO_3$) aqueous solution is added thereto, thereby extracting Li as $Li_2CO_3$. However, due to its high price, it is not preferable to use sodium carbonate from the viewpoint of obtaining $Li_2CO_3$ at a low cost.

In a case in which the Li recovery device 1 is used, it is possible to particularly increase the concentration of the Li ions 50 in the recovery liquid 200 as shown in FIGS. 5 and 6. Therefore, when pure water is used as the recovery liquid 200 in the initial state, and carbon dioxide ($CO_2$) is made to flow (for example, bubbling) through the recovery liquid 200 after the recovery of Li, it is possible to bond $CO_2$ to the Li ions 50 in the recovery liquid 200 and generate lithium carbonate ($LiCO_3$). The above-described treatment makes the recovery liquid 200 white turbid and enables the extraction of $Li_2CO_3$ as a precipitate. The above-described method is particularly effective in a case in which the Li recovery device 1 capable of particularly increasing the concentration of the Li ions 50 in the recovery liquid 200 is used. $CO_2$ can be obtained at a low cost or for free from a variety of facilities (thermal power plants and the like) that secondarily generate $CO_2$ and thus it is possible to obtain $Li_2CO_3$ at a particularly low cost. In addition, pure water to which hydrochloric acid or the like is not added can be used as die recovery liquid 200, and thus it is possible to safely obtain lithium carbonate at a low cost.

Figure 8A:
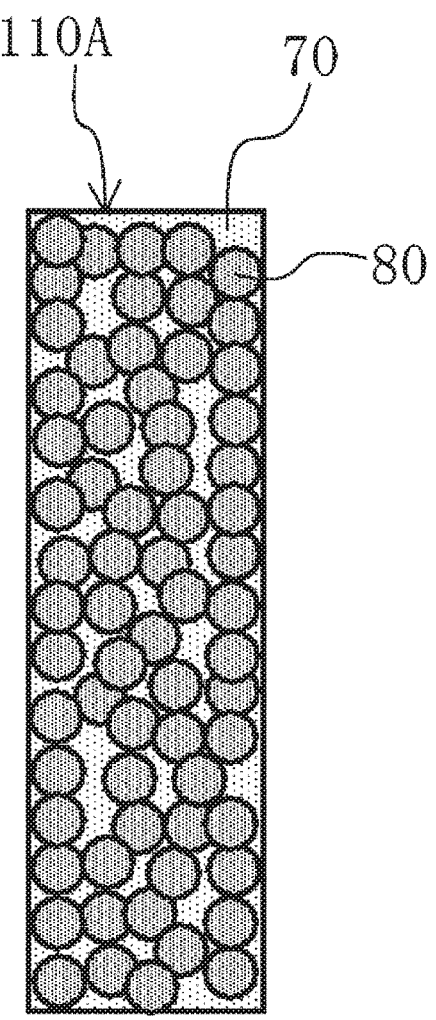
FIG. 8 is cross-sectional view showing a structure of a modification example of a selective permeable membrane which becomes an embodiment of the present invention.
FIG. 8B is a cross-sectional view showing the structure of another modification example of the selective permeable membrane which becomes the embodiment of the present invention.

Next, modification examples of the selective permeable membrane 10 will be described. As the selective permeable membrane 10, it is possible to use a selective permeable membrane having a different form of a selective permeable membrane including LLTO as a main body as described above. First, in the above-described example, the sintered body of LLTO, that is, a body obtained by sintering LLTO particles at a high temperature is used as the selective permeable membrane main body 10A. In contrast, it is possible to produce a selective permeable membrane main body 110A by bonding lithium ion superconductor particles 80 constituted of LLTO or the like using a cation exchange membrane 70 that is an organic substance as shown in FIG. 8A. Here, as the lithium ion superconductor particles 80, the same particles as the particles (powder) used to produce the selective permeable membrane main body 10A that is the sintered body can be used. As the cation exchange membrane 70, it is possible to use NAFION (registered trademark) or the like.

Even in this case, the selective transmissivity of Li is ensured by the lithium ion superconductor particles 80, and it is possible to conduct Li ions between the lithium ion superconductor particles 80 through the cation exchange membrane 70. While sintering at a high temperature is required to produce the selective permeable membrane main body 10A (sintered body), the selective permeable membrane main body 110A can be obtained by mixing power of the lithium ion superconductor particles (ion conductor particles) 80 into the cation exchange membrane 70 (NAFION) which has been dissolved in a solvent and become a liquid phase and then curing the cation exchange membrane 70 and thus the selective permeable membrane main body 110A can be obtained at a lower temperature. Therefore, it is possible to constitute the lithium ion superconductor particles 80 with, for example, a material which has a high lithium ion conductivity, but is not easily sintered at a high temperature. In addition, in this case, since a high Li non-conductive property can be obtained in the selective permeable membrane main body 110A, when this fact is used in the constitution of FIG. 1, a particularly great current (a high transport efficiency of the Li ions 50 to the recovery liquid 200) can be obtained.

Figure 8B:
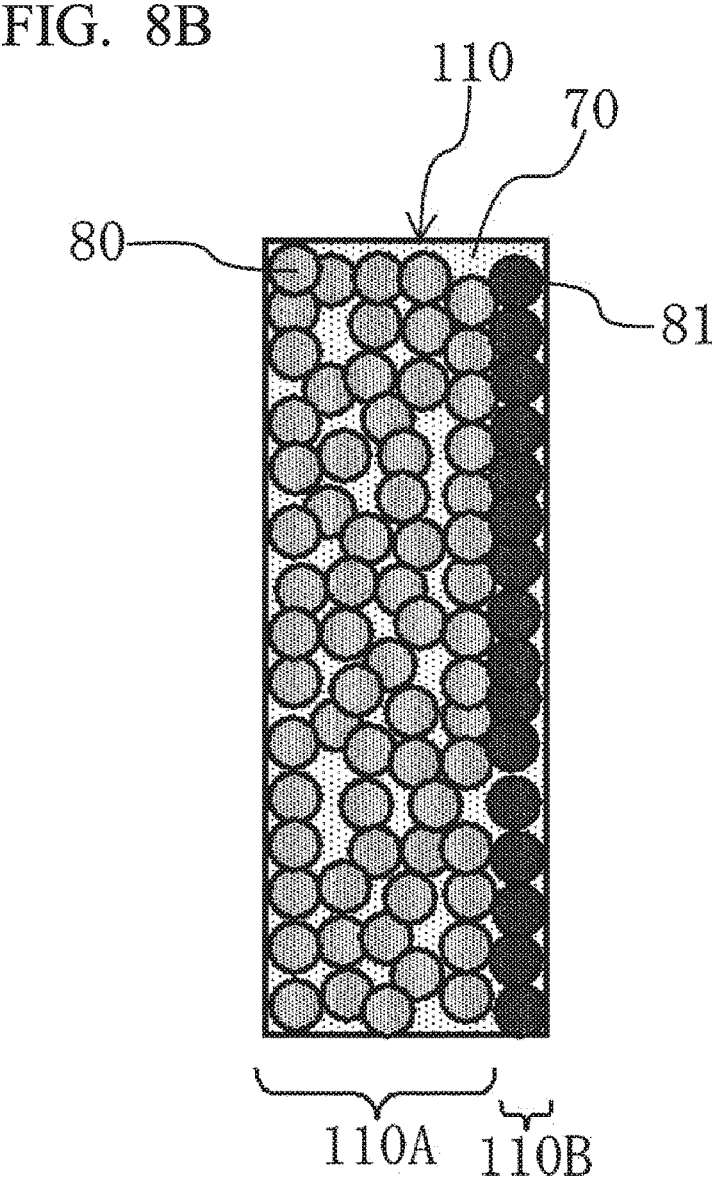

In addition, the Li adsorption layer 10B is formed by carrying out an acid treatment on the selective permeable membrane main body 10A, but it is also possible to produce a Li adsorption layer 110B by applying Li-adsorbing substance panicles 81 having a Li adsorption capability like HLTO to a surface using the cation exchange membrane 70 which has become a liquid phase as shown in FIG. 8B. In this ease, as a substance constituting the Li-adsorbing substance particles 81, it is possible to select a substance that is totally different from a substance constituting the lithium ion superconductor particles 80. In this ease, it is possible to obtain the Li adsorption layer 110B by applying and curing a mixture of a solvent and the Li-adsorbing substance particles 81 which serves as the cation exchange membrane 70 on the surface of the selective permeable membrane main body 110A. Even when SELEMION (registered trademark) or an ion liquid having a polymerized TFSI anion ($(CF_3SO_2N)$) is used as a material of the cation exchange membrane 70, it is possible to form the selective permeable membrane 110 and conduct the Li ions 50 in the same manner. Specific examples of the above-described ion liquid include PP13-TFSI, TMPA-TFSI, P13-TFSI, P14-TFSI, and the like as described in Japanese Unexamined Patent Application, First Publication No. 2012-55881 and ion liquids obtained by combining 1-Alkyl-3methylimidazolium as a cation with a TFSI anion.

In this case, the degree of freedom in selecting the substance constituting the Li adsorption layer 110B improves, and thus it is possible to select a material having a high Li-adsorbing efficiency even when the taw liquid 100 is neutral and use the material as the Li-adsorbing substance particles 81 while, for example, in the Li adsorption layer 10B (HLTO) a particularly high adsorption efficiency is obtained in a case in which the raw liquid 100 is alkaline. Specifically, it is also possible to use $H_{1.5}Mn_2O_4$ obtained by carrying out the same acid treatment as that carried out to form HLTO on lithium manganate ($Li_{1.5}Mn_2O_4$) power (a substance obtained by substituting Li with H in $Li_{1.5}Mn_2O_4$; corresponding to permanganic acid) as the Li-adsorbing substance particles 81. In addition, it is also possible to use $Li_4Ti_5O_{12}$ (lithium titanium oxide) or the like. These materials can also be set depending on the kind, pH, or the like of the raw liquid 100. In addition, the Li adsorption layer (HLTO) can also be formed in the same manner by carrying out an acid treatment in the selective permeable membrane main body 110A of FIG. 8A.

Figure 9:
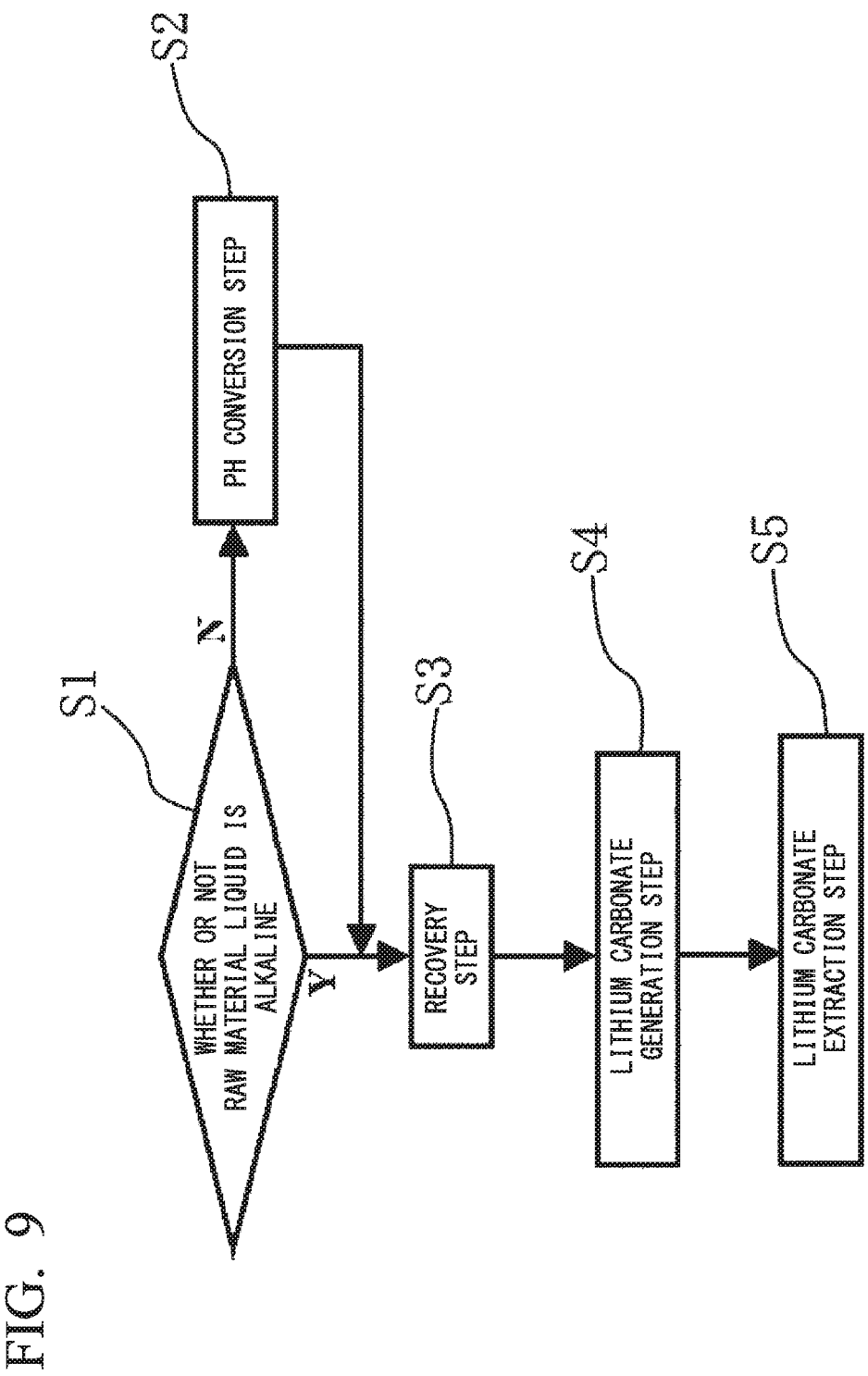
FIG. 9 is a flowchart showing the Li (ion) recovery method which becomes the embodiment of the present invention.

An order of obtaining lithium (lithium carbonate) from the raw material liquid 300 using the selective permeable membrane 10 or the like as described above (the lithium recovery method) is as shown in a flowchart of FIG. 9. In this ease, the selective permeable membrane 10 including LLTO as the selective permeable membrane main body 10A is used. First, depending on the pH of the raw material liquid 300, in a case in which the raw material liquid 300 is not alkaline or the pH value is lower than a desired value (S1), an electrodialysis treatment is carried out using the electrodialysis device 2 shown in FIG. 7, thereby obtaining the treatment liquid 400 which is alkaline and contains the Li ions 50 (pH conversion step: S2). After that, the treatment liquid 400 is used as the raw liquid 100, and only the Li ions 50 are moved into the recovery liquid 200 using the Li recovery device 1 of FIG. 1, thereby increasing the concentration of the Li ions 50 in the recovery liquid 200 (recovery step: S3) Alternatively, in a case in which the raw material liquid 300 is alkaline or the pH value is equal to or higher than a desired value (S1), the raw material liquid 300 is directly used as the raw liquid 100, and the recovery step (S3) is carried out in the same manner using the Li recovery device 1 of FIG. 1. In the recovery step (S3), the Li recovery device 1 may be used in any of a battery mode or an electrodialysis mode as described above.

However, in a case in which the Li adsorption capability does not depend on the pH of the raw liquid 100 like the Li adsorption layer 110B in the selective permeable membrane 110, the pH conversion step (S2) is not required regardless of the pH of the raw material liquid 300, and the raw material liquid 300 can be directly used as the raw liquid 100.

After that, as described above, carbon dioxide is transmitted through the recovery liquid 200 having an increased concentration of the Li ions 50, thereby generating and precipitating lithium carbonate ($Li_2CO_3$) (lithium carbonate generation step: S4). After that, the precipitated lithium carbonate is extracted by means of filtration or the like (lithium carbonate extraction step: S5). Meanwhile, the lithium carbonate generation step (S4) and the lithium carbonate extraction step (S5) are carried out in order to obtain the recovered Li in a lithium carbonate form. Therefore, depending on the final form of the obtained Li, other treatments are carried out instead of these steps. At this time, as the recovery liquid 200 in the initial state which is used in the recovery step (S3), it is possible to use pure water or an aqueous solution other than pure water or appropriately set the pH or the like of the aqueous solution depending on the final form of the obtained Li. It is clear, that, even in such a case, a selective permeable membrane including a combination of a selective permeable membrane main body and a Li adsorption layer as described above is effective. Meanwhile, lithium hydroxide ($LiOH.H_2O$) as well as lithium carbonate ($Li_2CO_3$) is also used as a raw material of lithium ion batteries. In the case of obtaining lithium hydroxide, the crystals of lithium hydroxide can be easily obtained only by evaporating moisture in the recovery liquid 200.

In addition, in the Li recovery device 1, a great currant (ion current) can be made to flow between the first electrode 11 and the second electrode 12. In such a case, the electrolysis of water also proceeds, particularly, on the recovery liquid 200 side. Therefore, when pure water is used as the recovery liquid 200 in the initial state (before the initiation of the recovery step), it is also possible to generate hydrogen at a high efficiency. That is, it is also possible to realize a method for producing hydrogen at a high efficiency using the Li recovery device 1. In this case, it is preferable to use the Li recovery device 1 particularly in the electrodialysis mode.

REFERENCE SIGNS LIST

1 Li (ION) RECOVERY DEVICE
2 ELECTRODIALYSIS DEVICE
8, 9 TREATMENT TANK
10, 110 SELECTIVE PERMEABLE MEMBRANE (LITHIUM SELECTIVE PERMEABLE MEMBRANE)
10A, 110A SELECTIVE PERMEABLE MEMBRANE MAIN BODY
10B, 110B Li ADSORPTION LAYER
11 FIRST ELECTRODE
12 SECOND ELECTRODE
21 CATION EXCHANGE MEMBRANE
22 NEGATIVE ELECTRODE
23 POSITIVE ELECTRODE
50 Li ION
51 Na ION
70 CATION EXCHANGE MEMBRANE
80 LITHIUM ION SUPER CONDUCTOR PARTICLE
81 Li-ADSORBING SUBSTANCE PARTICLE
100 RAW LIQUID
200 RECOVERY LIQUID
300 RAW MATERIAL LIQUID
400 TREATMENT LIQUID

What is claimed is:

1. A lithium selective permeable membrane that is configured to selectively transmit lithium (Li) ions from a first main surface side toward a second main surface side, the lithium selective permeable membrane comprising:
    a selective permeable membrane main body constituted of a ion conductor of lithium as a main body; and
    a lithium adsorption layer that is formed on a surface of the selective permeable membrane main body on the first main surface side and selectively adsorbs the lithium ions.

2. The lithium selective permeable membrane according to claim 1,
    wherein the ion conductor is $(Li_x, La_y)TiO_z$ (here, $x=3a-2b$, $y=2/3-a$, $z=3-b$, $0<a\leq 1/6$, $0\leq b\leq 0.06$, $x>0$).

3. The lithium selective permeable membrane according to claim 1,
    wherein the selective permeable membrane main body is a sintered body including the ion conductor as a main body.

4. The lithium selective permeable membrane according to claim 1,
    wherein the selective permeable membrane main body is constituted of particles, which are bonded together through a cation permeable membrane, constituted of the ion conductor.

5. The lithium selective permeable membrane according to claim 4,
    wherein the cation permeable membrane is constituted of NAFION (registered trademark), SELEMION (registered trademark), or an ion liquid having a polymerized TFSI anion (($CF_3SO_2)_2N^-$).

6. The lithium selective permeable membrane according to claim 1,
    wherein the lithium adsorption layer is formed by an acid treatment on the surface of the selective permeable membrane main body on the first main surface side.

7. The lithium selective permeable membrane according to claim 1,
    wherein the lithium adsorption layer includes lithium adsorption substance particles that are each constituted of a substance different from the selective permeable membrane main body and that each have a particle shape.

8. The lithium selective permeable membrane according to claim 7,
    wherein the lithium adsorption substance particles are formed by carrying out an acid treatment on lithium manganate ($Li_{1.5}Mn_2O_4$).

9. A lithium recovery device that recovers lithium into a recovery liquid which is an aqueous solution by moving lithium ions from a raw liquid which is an aqueous solution and includes the lithium to the recovery liquid, the lithium recovery device comprising:
    the selective permeable membrane according to claim 1, installed so as to separate the raw liquid and the recovery liquid with the raw liquid placed on the first main surface side and the recovery liquid placed on the second main surface side;
    a first electrode fixed to the first main surface side of the lithium selective permeable membrane; and
    a second electrode fixed to the second main surface side of the lithium selective permeable membrane.

10. A lithium recovery method comprising:
    a recovery step of recovering lithium into the recovery liquid from the raw liquid using the lithium recovery device according to claim 9.

11. The lithium recovery method according to claim 10,
    wherein the first electrode is used as a positive side, the second electrode is used as a negative side, and a voltage is applied between the first electrode and the second electrode.

12. The lithium recovery method according to claim 10, further comprising:
    a lithium carbonate generation step of generating lithium carbonate by transmitting carbon dioxide through the recovery liquid obtained after the recovery step using water as the recovery liquid before initiation of the recovery step.

13. A hydrogen production method,
    wherein, in the lithium recovery device according to claim 9, water is used as the recovery liquid, the first electrode is used as a positive side, the second electrode is used as a negative side, and a voltage is applied between the first electrode and the second electrode, thereby generating hydrogen from the recovery liquid.

14. A lithium recovery method according to claim 10:

wherein a pH conversion step of generating a treatment liquid that is an alkaline aqueous solution containing lithium from a raw material liquid that is a non-alkaline aqueous solution containing lithium; and a recovery step of recovering lithium into the recovery liquid using the treatment liquid obtained after the pH conversion step as the raw liquid and the lithium recovery device.

15. The lithium recovery method according to claim 14, wherein, in the pH conversion step, an electrodialysis treatment is carried out with the raw material liquid disposed on a positive potential side and an aqueous solution disposed on a negative potential side using a cation exchange membrane as a boundary, and then the aqueous solution on the negative potential side is used as the treatment liquid.

\* \* \* \* \*